(12) United States Patent
Gopal et al.

(10) Patent No.: US 8,914,641 B2
(45) Date of Patent: Dec. 16, 2014

(54) METHOD FOR SIGNING AND VERIFYING DATA USING MULTIPLE HASH ALGORITHMS AND DIGESTS IN PKCS

(71) Applicants: Vinodh Gopal, Westborough, MA (US); Sean M. Gulley, Boston, MA (US); James D. Guilford, Northborough, MA (US); Wajdi K. Feghali, Boston, MA (US)

(72) Inventors: Vinodh Gopal, Westborough, MA (US); Sean M. Gulley, Boston, MA (US); James D. Guilford, Northborough, MA (US); Wajdi K. Feghali, Boston, MA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/712,401

(22) Filed: Dec. 12, 2012

(65) Prior Publication Data

US 2014/0019764 A1    Jan. 16, 2014

Related U.S. Application Data

(63) Continuation-in-part of application No. 13/631,761, filed on Sep. 28, 2012.

(60) Provisional application No. 61/670,472, filed on Jul. 11, 2012.

(51) Int. Cl.
    *H04L 9/32*                     (2006.01)

(52) U.S. Cl.
    CPC .................................. *H04L 9/3247* (2013.01)
    USPC ............ 713/180; 713/168; 713/170; 713/181

(58) Field of Classification Search
    CPC ..... G06F 21/64; G06F 21/645; H04L 9/3223; H04L 9/3247; H04L 9/3236; H04L 9/3242; H04L 9/3281; H04L 63/12; H04L 63/123

USPC .................................... 713/168, 176, 180, 181
See application file for complete search history.

(56) References Cited

U.S. PATENT DOCUMENTS 5,373,561 A * 12/1994 Haber et al. .................. 713/157
2004/0093493 A1 * 5/2004 Bisbee et al. ................. 713/156

(Continued)

OTHER PUBLICATIONS

Hal Finney. "More problems with hash functions" Article published Aug. 20, 2004 (2 pages) http://article.gmane.org/gmane.comp.encryption.general/5154.*

(Continued)

*Primary Examiner* — Joseph P. Hirl
*Assistant Examiner* — Thomas Gyorfi
(74) *Attorney, Agent, or Firm* — Blakely, Sokoloff, Taylor & Zafman LLP

(57) ABSTRACT

Methods, systems, and apparatuses are disclosed for signing and verifying data using multiple hash algorithms and digests in PKCS including, for example, retrieving, at the originating computing device, a message for signing at the originating computing device to yield a signature for the message; identifying multiple hashing algorithms to be supported by the signature; for each of the multiple hashing algorithms identified to be supported by the signature, hashing the message to yield multiple hashes of the message corresponding to the multiple hashing algorithms identified; constructing a single digest having therein each of the multiple hashes of the messages corresponding to the multiple hashing algorithms identified and further specifying the multiple hashing algorithms to be supported by the signature; applying a signing algorithm to the single digest using a private key of the originating computing device to yield the signature for the message; and distributing the message and the signature to receiving computing devices. Other related embodiments are disclosed.

22 Claims, 9 Drawing Sheets

(56) References Cited

U.S. PATENT DOCUMENTS

| | | | | |
|---|---|---|---|---|
| 2006/0075245 | A1* | 4/2006 | Meier | 713/176 |
| 2007/0016785 | A1* | 1/2007 | Guay et al. | 713/176 |
| 2007/0106908 | A1* | 5/2007 | Miyazaki et al. | 713/189 |
| 2010/0293384 | A1* | 11/2010 | Potkonjak | 713/176 |
| 2011/0191596 | A1* | 8/2011 | Brizek | 713/189 |
| 2012/0151216 | A1* | 6/2012 | Serret-Avila et al. | 713/176 |
| 2013/0073864 | A1* | 3/2013 | Sarkar et al. | 713/189 |
| 2013/0311772 | A1* | 11/2013 | Etheridge | 713/156 |

OTHER PUBLICATIONS

T. Dierks et al. "RFC 4346: The Transport Layer Security (TLS) Protocol Version 1.1" © 2006 The Internet Society (87 pages) http://tools.ietf.org/pdf/rfc4346.pdf.*

Mark Stevens et al. "Vulnerability of software integrity and code signing applications to chosen-prefix collisions for MD5" Published Nov. 30, 2007 (6 pages) http://web.archive.org/web/20080212054458/http://www.win.tue.nl/hashclash/SoftIntCodeSign.*

"Public-Key Cryptography Standards (PKCS) #1: RSA Cryptography Specifications Version 2.1," by Jonsson et al., dated Feb. 2003, 72 pages.

"PKCS #1 v2.1: RSA Cryptography Standard," by RSA Laboratories dated Jun. 14, 2002, 61 pages.

"PKCS #15 v1.1: Cryptographic Token Information Syntax Standard," by RSA Laboratories dated Jun. 6, 2000, 81 pages.

"rsax_mod_exp_1024_Complete_VS" zip package, retrieved from http://www.intel.com/p/en_US/embedded/hwsw/software/crc-license?id=6336&iid=6337 on Nov. 25, 2012, 112 pages.

"New Instructions Supporting Large Integer Arithmetic on Intel® Architecture Processors," dated Aug. 2012, 16 pages.

"Speeding up Big-Numbers Squaring," from the 2012 Ninth International Conference on Information Technology, 2012, 3 pages.

* cited by examiner

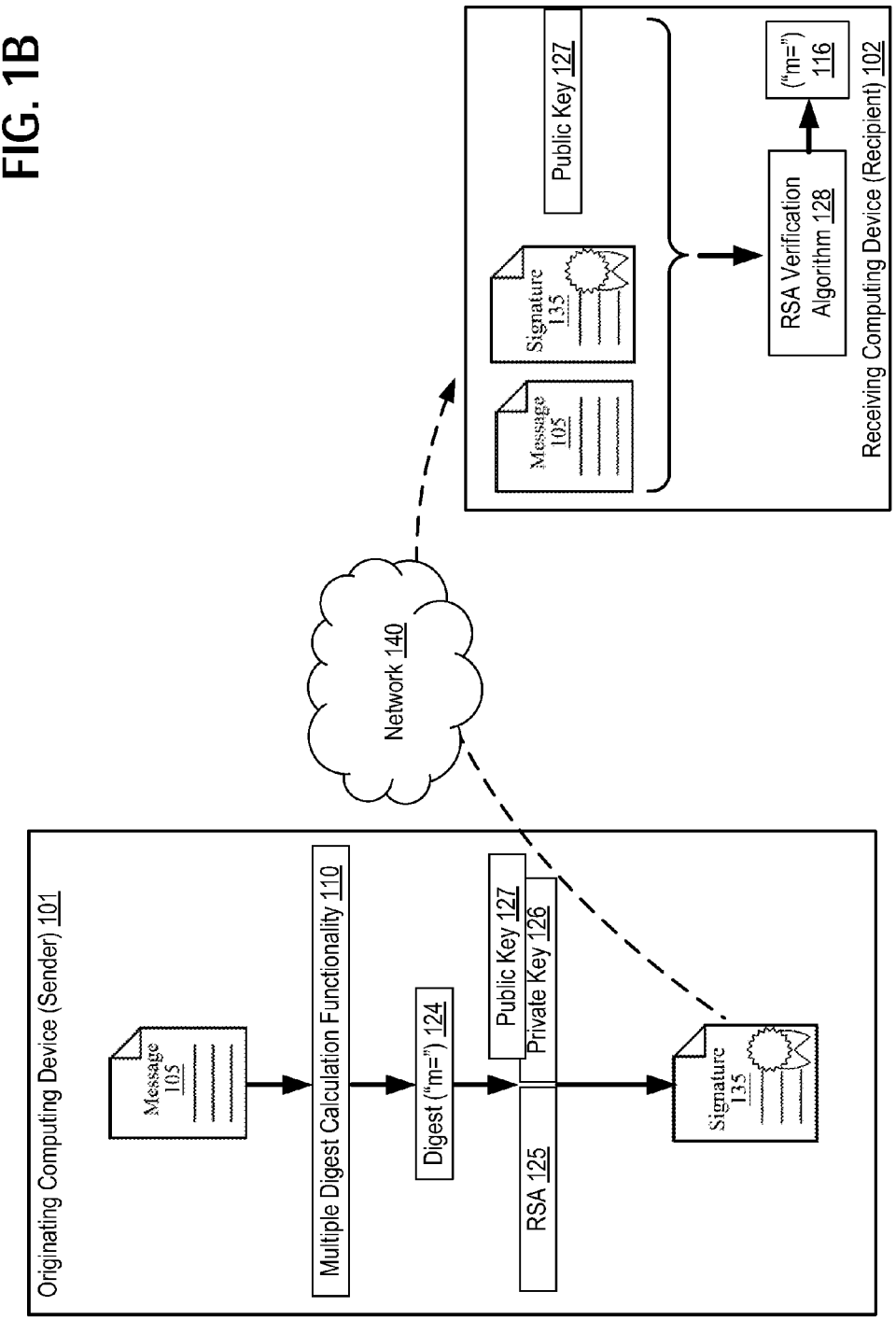

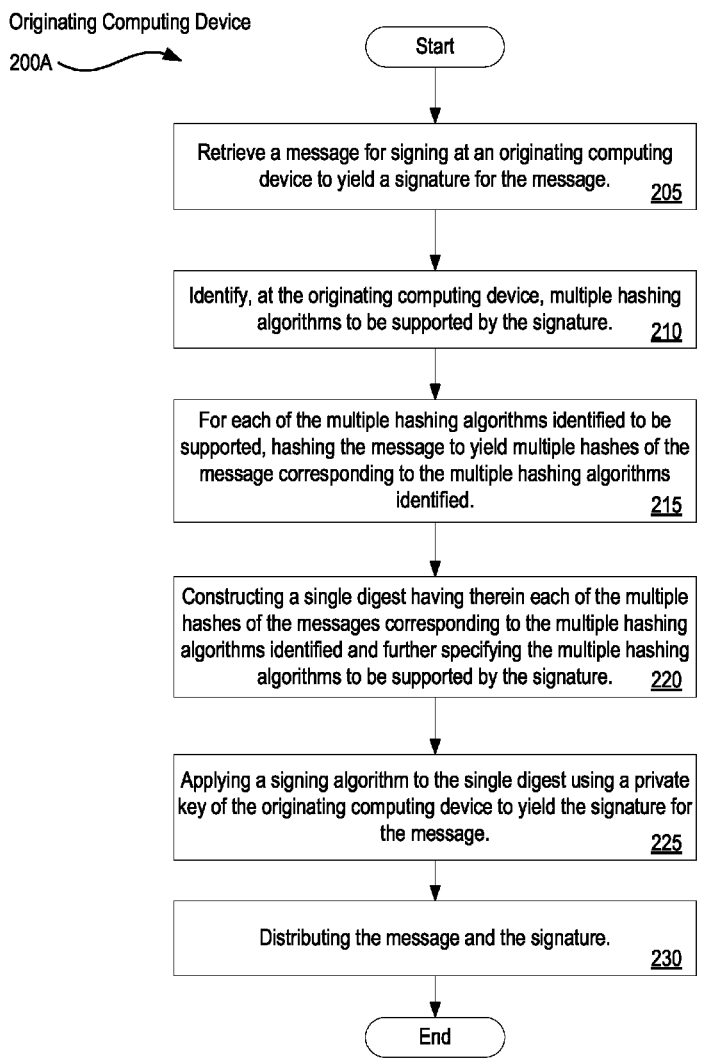

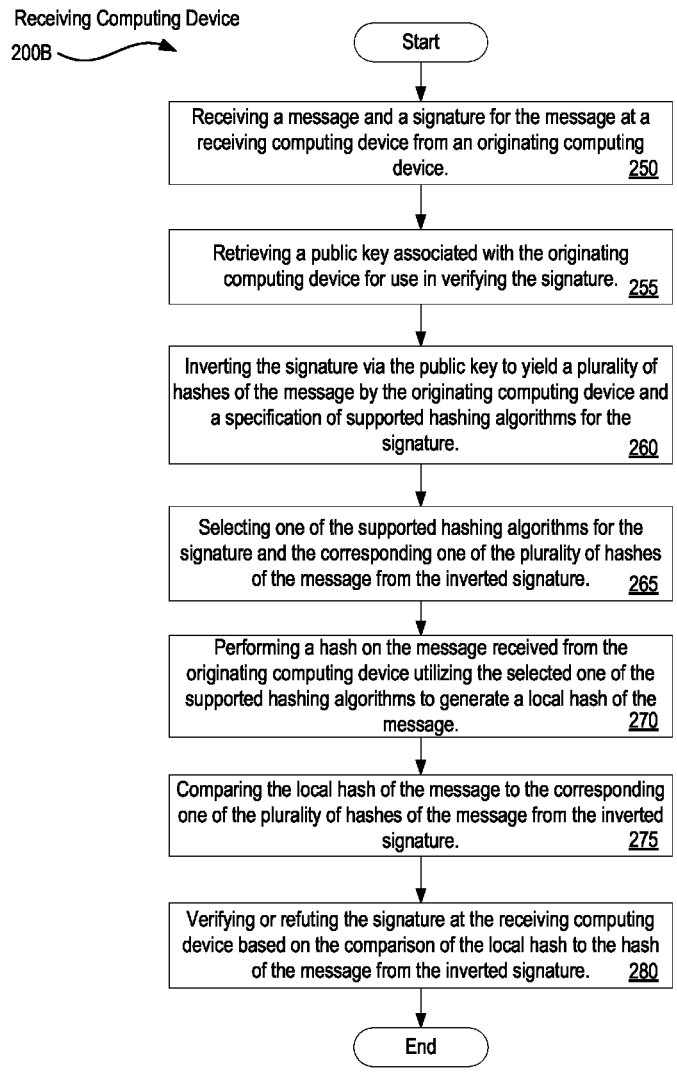

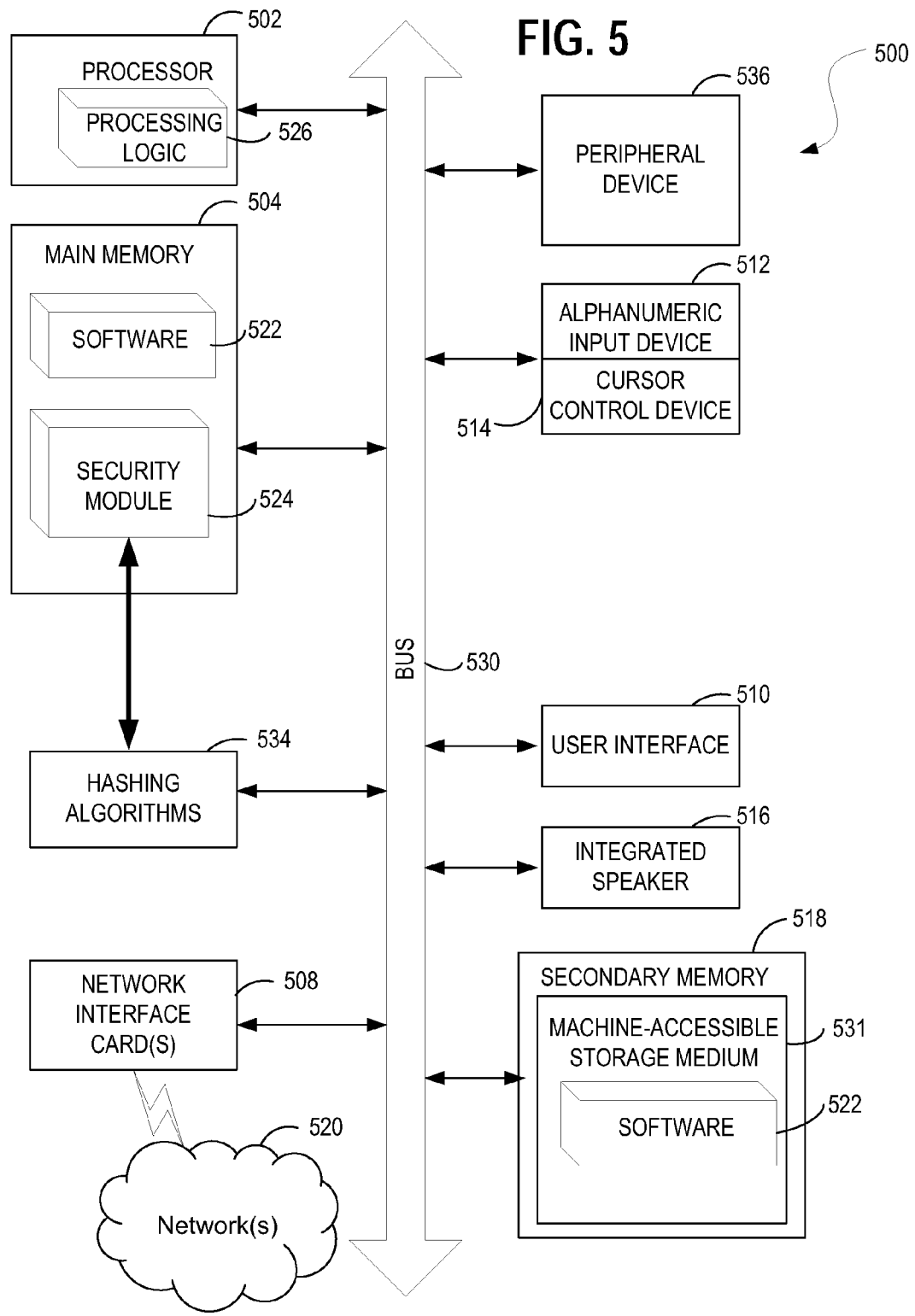

US 8,914,641 B2

METHOD FOR SIGNING AND VERIFYING DATA USING MULTIPLE HASH ALGORITHMS AND DIGESTS IN PKCS

CLAIM OF PRIORITY

This continuation-in-part application is related to, and claims priority to, the provisional utility application entitled "METHOD, SYSTEM, AND DEVICE FOR PARALLEL PROCESSING OF A SINGLE DATA BUFFER," filed on Jul. 26, 2012, having an application number of 61/670,472; and the utility application entitled "PARALLEL PROCESSING OF A SINGLE DATA BUFFER," filed on Sep. 28, 2012, having an application number of 13/631,761, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems, methods and apparatuses for signing and verifying data using multiple hash algorithms and digests in PKCS.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

A digital signature or digital signature scheme is a mathematical scheme for demonstrating the authenticity of a digital message or document. A valid digital signature gives a recipient reason to believe that the message was created by a known sender, and that it was not altered in transit. Digital signatures are commonly used for software distribution, financial transactions, and in other cases where it is important to detect forgery or tampering, for instance, to ensure that a message being delivered is authentic or to ensure that software being distributed for installation is free of malicious alterations by another entity different than the originator.

Digital signatures employ a type of asymmetric cryptography. For messages sent through a nonsecure channel, a properly implemented digital signature gives the receiver reason to believe the message was sent by the claimed sender. A signature generated from a fixed message and fixed private key should verify the authenticity of that message by using the corresponding public key. It should further be computationally infeasible to generate a valid signature for a party who does not possess the private key.

In cryptography, PKCS (Public-Key Cryptography Standards) is a set of standards devised and published by RSA Security Inc., which in recent years, have become relevant to standards organizations such as the IETF (Internet Engineering Task Force) and PKIX (Public-Key Infrastructure (X.509)) working groups.

The problem with the conventional mechanisms for providing digital signatures is that the resulting signature is wasteful as it incorporates sometimes large amounts of padding which is nothing more than arbitrary data, and further because conventional mechanisms dictate a single digest which must be utilized by the recipient to verify the digital key, regardless of whether the particular digest is supported by the recipient or best suited to the particular needs of the recipient.

The present state of the art may therefore benefit from the methods and apparatuses for signing and verifying data using multiple hash algorithms and digests in PKCS as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1B illustrates an exemplary architecture in accordance with which embodiments may operate;

FIGS. 2A and 2B set forth flow diagrams illustrating methods for signing and verifying data using multiple hash algorithms and digests in PKCS in accordance with which embodiments may operate;

FIG. 5 illustrates a diagrammatic representation of a machine in the exemplary form of a computer system, in accordance with one embodiment.

DETAILED DESCRIPTION

Figure 1A:
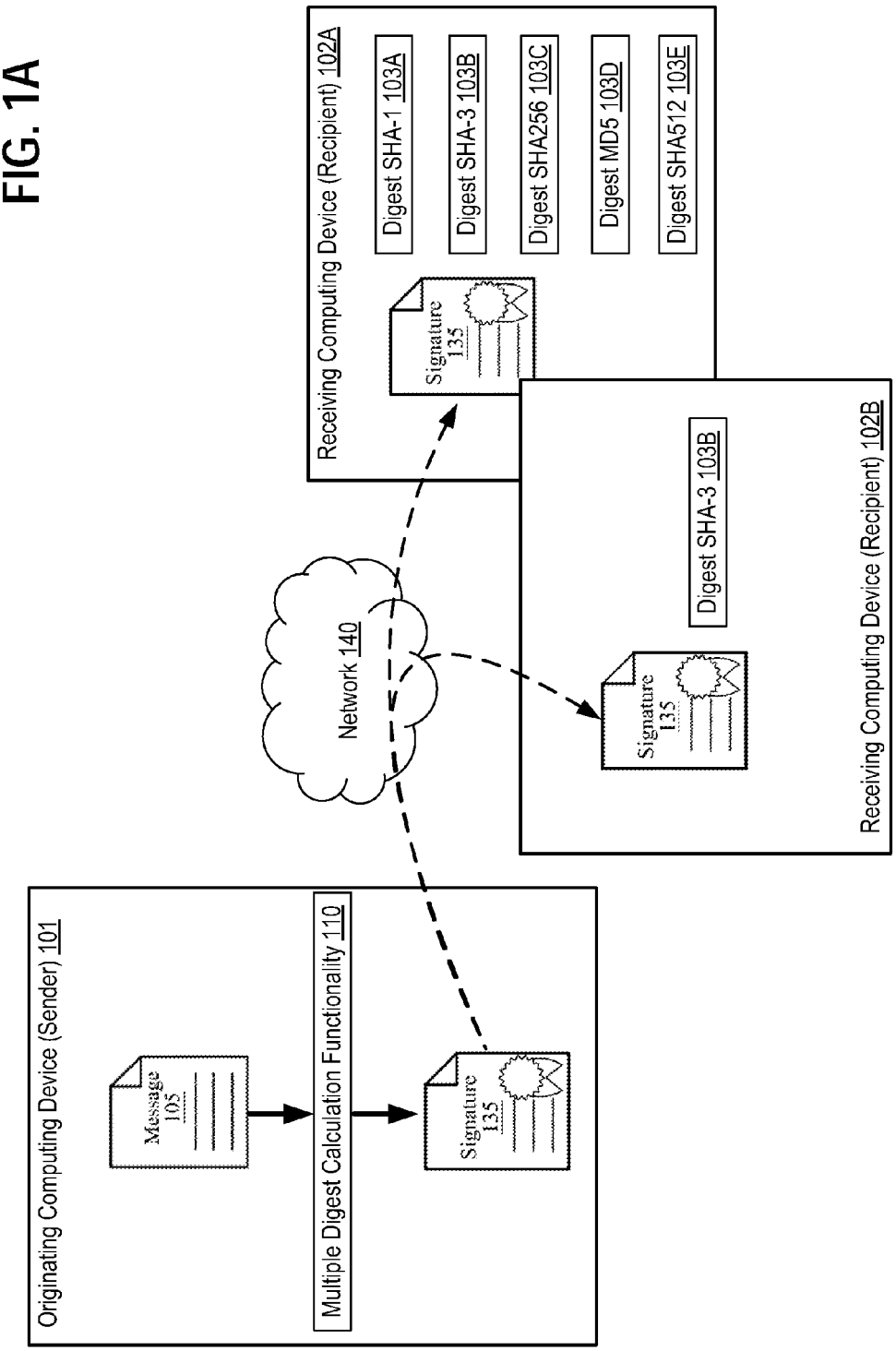
FIG. 1A illustrates an exemplary architecture in accordance with which embodiments may operate.

Described herein are systems, apparatuses, and methods for signing and verifying data using multiple hash algorithms and digests in PKCS.

The mechanisms described herein improve upon the conventional signing and verification operations utilizing Public-Key Cryptography Standards (PKCS) by supporting and implementing techniques for signing and verifying data using multiple hash algorithms and digests in PKCS. In particular, new methodologies for signatures are described which allow for multiple hash digests within a single digital signature, whereas conventional mechanisms mandate or dictate the use of a single such digest. For instance, the digital signatures described herein are capable of supporting multiple digests, such as SHA-1, SHA256, SHA512, MD5, etc., for varying algorithms and modes of operation of algorithms, such as tree hashing. SHA stands for "Secure Hash Algorithm" and MD of the MD5 stands for "Message-Digest," though other hashing algorithms exist. Moreover, whereas conventional mechanisms introduce wasteful padding into the digital signature so as to attain a standardized size, the techniques described herein utilized this otherwise wasted space, and thus, yield a digital signature which is no larger in size than conventional digital signatures compliant with PKCS, yet will support the multiple digests described. Use of such padding therefore provides more efficient use of the signature (e.g. 2048 bits for RSA2048 of which only up to 512 bits are actually used by the largest common digests) and further provides much greater flexibility in verification at the recipient end, as the recipient can identify the available digests and select one of its own accord, rather simply having one mandated to it for verification purposes. For instance, the recipient is enabled to select and utilize the digest which is best suited for the local computing environment.

This flexibility is important for many recipient computing devices because certain digests will perform better than others for any given recipient computing device. For instance, some digests perform optimally on highly parallelized processors, and thus, a recipient device with such parallelized processing capability would be better suited selecting its optimal digest for signature verification rather than having the originating computing device that created the signature simply dictate which digest must be utilized. In other situations, it is possible that a recipient device lacks support for the type of digest utilized in creating the digital signature, and thus, would be wholly unable to verify the digital signature. However, where multiple digests are supported for verification of the signature, the likelihood that all of the digests provided cannot be supported by a given recipient are greatly reduced. In yet other embodiments, the recipient may support a mandated signature, yet be required to perform the algorithm without the aid of hardware acceleration, and thus suffer greatly from poor performance, whereas other digests are better suited for the client, but unfortunately not made available in the digital signature. This situation also is alleviated by having digital signatures distributed supporting multiple digests as described herein, thus enabling greater alignment between the optimal digest supported by a given recipient client device and the available digests supported by the digital signature. These and other benefits will be described in greater detail below.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A illustrates an exemplary architecture 100A in accordance with which embodiments may operate. In particular, depicted are an originating computing device 101 operating as the sender in this example, as well as two receiving computing devices 102A and 102B, each operating as recipients, each of the devices being communicatively interfaced via network 140, for instance, over the public Internet.

At the originating computing device 101, it can be seen that a message 105 is provided. This could be a document or an executable program, etc. The message is processed through multiple digest calculation functionality 110 of the originating computing device 101 which simply provides support for multiple digests, for instance, exemplary digests (e.g., hash functions) include SHA-1, SHA-3, SHA256, MD5, SHA512, and others.

The multiple digest calculation functionality 110 yields a signature 135 which supports multiple digests, for instance, at a minimum, two or more of the exemplary digests SHA-1, SHA-3, SHA256, MD5, SHA512, though other digests are feasible and supported by the techniques described.

Having the signature 135, the originating computing device sends the signature to each of receiving computing devices 102A and 102B. At receiving computing device 102A, there is a vast array of supported digests, including Digest SHA-1 103A, Digest SHA-3 103B, Digest SHA256 103C, Digest MD5 103D, and Digest SHA512 103E. Because of this wide array of supported digests 103A-E, the receiving computing device 102A may identify the multiple digests supported for verifying the signature 135 received, and then choose from among any of its supported digests 103A-E which corresponds to one supported by the signature 135, and then perform the verification process using the digest selected by the receiving computing device itself.

Notably, no single digest has been dictated to the receiving computing device 102A (e.g., the recipient) by the originating computing device 101 (e.g., the sender).

Conversely, receiving computing device 102B is no so well enabled, having support only for Digest SHA-3 103B. Had the originating computing device 101 sent a conventional signature created using, for example, an MD5 hash/digest function, then this particular receiving computing device 102B would be wholly unable to perform verification of the conventional signature. However, in this example, so long as the originating computing device 101 has created the signature 135 with one of the multiple digests supported being SHA-3, then the receiving computing device 102B will simply identify that supported digest as corresponding to one of its own supported digests Digest SHA-3 103D, the one and only supported digest in this example, and then process the signature 135 accordingly, by verifying using SHA-3.

FIG. 1B illustrates an exemplary architecture 100B in accordance with which embodiments may operate. Generally speaking, a digital signature scheme consists of the following basic phases. A first phase carries out the key generation algorithm in which a private key 126 is selected at random from a set of possible private keys. The generation algorithm outputs the private key 126 and a corresponding public key 127. The message is processed via the multiple digest calculation functionality 110 to yield a digest 124. A signing algorithm represented by RSA 125 then processes the digest in which the RSA 125 signing algorithm, given the digest 124 of the message 105 and a private key 126 produces a signature 135 from the digest 124 of the message 105.

In the context of the methodologies described herein, the signing algorithm is modified such that a signature 135 is produced which supports multiple digests developed using the multiple hashes, any one of which are eligible for use in a later verification phase at a receiving computing device 102.

A verification phase for the digital signature 135 operates at the receiving computing device 102, depicted here having received each of the message 105 in its unmodified state, but for which authenticity is unknown, the public key 127, and the signature 135 from the originating computing device 101 attesting as to the veracity of the message 105 sent.

An RSA verifying algorithm 128 then operates by, given a message 105, a public key 127, and the signature 135, either accepting or rejecting the message 105 as authentic by performing its own hash on the message using the public key 127, and then comparing the result to the signature 135 provided by the originating computing device 101.

The goal of the originating computing device 101 is to convey to the receiving computing device 102 that "yes," this message 105 is from me (e.g., the sender) and is authentic (e.g., as evidenced by the sender's signature 135). The original message itself can be literally any length. For instance, an executable computer program may be massive in comparison to the resulting signature 135, though it is feasible that the original message 105 is smaller in size that the resulting signature 135, for instance, a simple text file, etc.

The RSA signing algorithm will produce either a 1024 or 2048 bit result via RSA1024 and RSA2048 signing algorithms respectively. RSA additionally includes 3072 and 4096 bit modes which may be utilized in accordance with the described embodiments.

Regardless of the size of the original message 105, each hash algorithm will produce the same size digest each time, such as 160 bits if using SHA-1. So depending on the hash used, the output from a 1 kb file or a 1 gb file will always be the smaller uniform digest size. And then further still, regardless of the hash used on the message 105 to create the digest 124, or the size of the digest 124 itself from the various possible hash algorithms (e.g., MD5, SHA-1, SHA-256, etc.), the resulting signature 135 produced by the RSA 125 signing algorithm will be uniform in size from the RSA1024 and RSA2048 compliant singing algorithms respectively.

Hashing is a one way function such that, based on the result from the hash, there is no way to go backwards because too much information is lost. However, the signature 135 can be created based on an arbitrary length of data, and thus, a message 105 is provided, which is then hashed through the multiple digest calculation functionality 110, and then signed using RSA 125 with private key 126, to yield a standardized sized signature 135. The private key 126 remains hidden by the originating computing device 101 and will not be shared with any other device, and because it is kept private, no other entity can mimic this same RSA 125 signing algorithm to arrive upon the same result as did the originating computing device 101. The public key 127 which is also generated by the originating computing device 101 in concert with the private key 126 is shared with the world, and is known to any computing device wishing to have it. For instance, the public key may be retrievable based on what company is the originating computing device 101 distributing the message 105. Such public keys 127 may be maintained by a trusted certificate authority which is responsible for maintaining public keys and handing them out freely, without restriction, upon request.

The receiving computing device 102 is thus able to apply the known public key 127 to invert the signature 135 from the originating computing device 101, as a verifying process (e.g., via RSA verification algorithm 128), which results in element "m=" at element 116, which corresponds to the "m=" which is input to the RSA 125 function of the originating computing device 101.

Using the public key to invert the signature 135 revealing the "m=" at element 116, it is then possible to identify the individual digests or hashes of the original message, each representative of a secure hash of the original message 105 via the respective multiple supported hash functions supported by the multiple digest calculation functionality 110.

To actually perform the RSA verification algorithm 128 at the receiving computing device, a comparison will be made between a hash conducted on the message at the receiving computing device and the inverted "m=" inverted (e.g., deciphered) from the signature 135 using the public key. The receiving computing device selects the hash it wishes to utilize from among the multiple supported hashes applied by the multiple digest calculation functionality 110 which are identifiable from the inverted "m=" at element 116, then applies the selected hash function against the original message 105 received from the originating computing device 101, and then the receiving computing device also has a hash of the original document using the appropriate hash algorithm, which may then be compared against the appropriate one of the multiple hashes delineated by the "m=" to authenticate the message 105 and the signature 135 or to refute them should the comparison fail.

Whereas conventional mechanisms provide only the single hash within an inverted signature result using the public key, the embodiments described herein will yield an inverted signature result at element 116 for "m=" in which there are multiple identifiable hashes and their corresponding hash functions, any one of which the receiving computing device may select and utilize to perform its own corresponding hash function and subsequent comparison for the sake of verification. According to one embodiment, verification means may utilize multiple different digests for comparison, rather than processing only a digest verification and comparison.

Figure 1C:
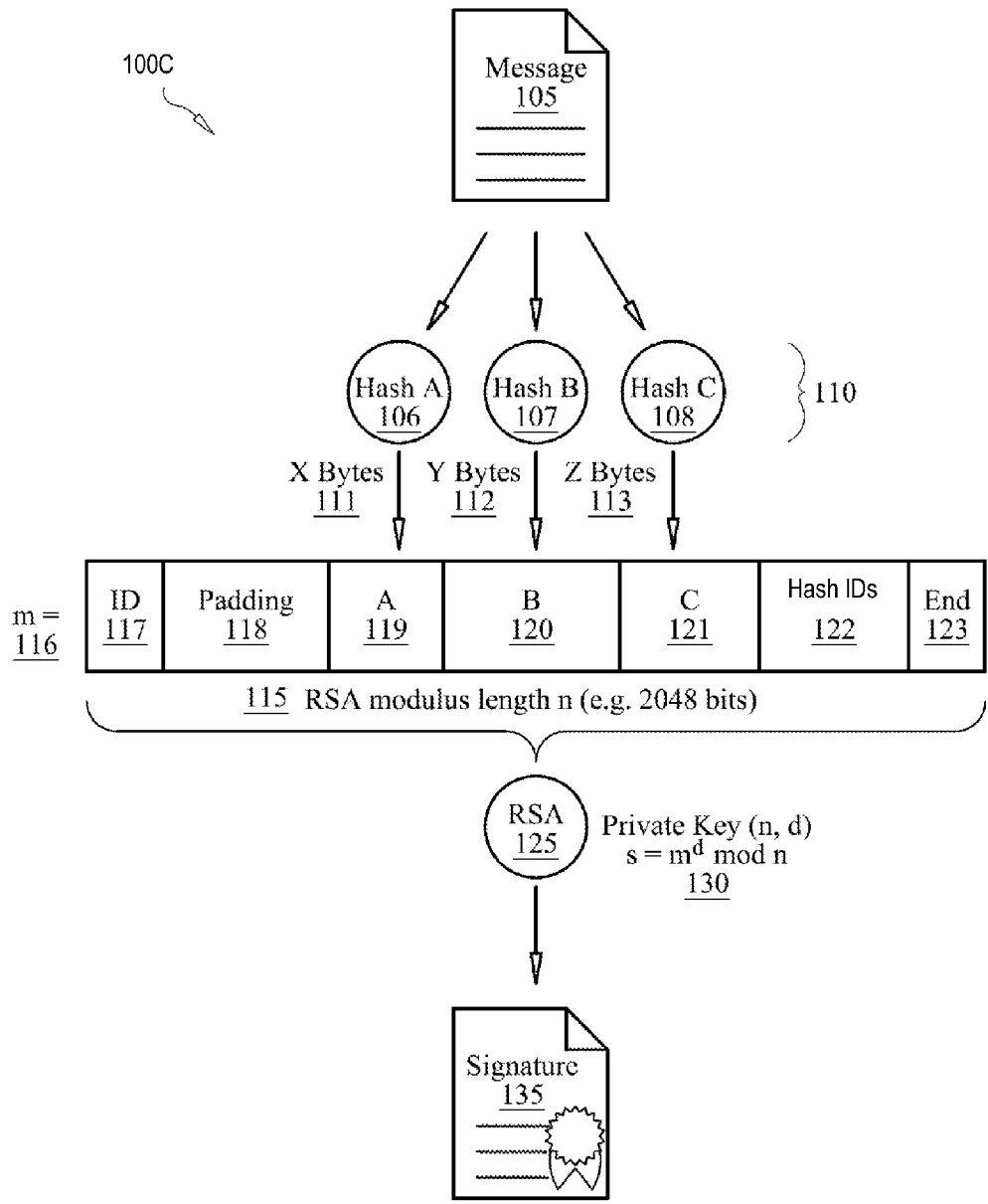
FIG. 1C illustrates an exemplary architecture in accordance with which embodiments may operate.

FIG. 1C illustrates an exemplary architecture 100C in accordance with which embodiments may operate. Here, the multiple digest calculation functionality 110, the intermediate element 116 "m=" having the multiple hashes therein and the multiple identified hash algorithms utilized, as well as the resulting signature 135 which supports the multiple hashes/digests.

Beginning at the top, a message 105 is depicted which is to be signed by hashing the message utilizing three exemplary hashes or algorithms, specifically hash A at element 106, hash B at element 107, and hash C at element 108, representing the multiple digest calculation 110 collectively. These individual hashes 106, 107, and 108 could be, for instance, MD5, SHA-1, and SHA256, in a particular embodiment, or SHA512, MD5, and SHA-3 in another embodiment, or any combination of desired hashes, so long as multiple are supported.

Each of the respective hashes 106, 107, and 108 yields data as output, in which X bytes at element 111 are the output of hash A 106, in which Y bytes at element 112 are the output of hash B at element 107, and further in which Z btyes at element 113 are the output of hash C at element 108.

The resulting "m=" depicted at element 116 is then utilized by the RSA 125 signing algorithm to produce the signature 135 supporting the multiple digests, in this particular embodiment, signature 135 having been created by the RSA 125 signing algorithm using hashes A, B, and C (106, 107, and 108) correspondingly supports hashes A, B, and C (106, 107, and 108). For instance, here the RSA 125 signing algorithm is depicted as:

Private Key (n,d) $s=m^d$ mod n.

Conventional signing algorithms operate utilizing standards such as PKCS, where a signing party generates a digest of a large file (e.g. SHA-1 digest), and then uses RSA-decrypt (with its private key) to sign the digest, thus creating the signature. Verification of the signature uses RSA-encrypt in conjunction with the public key of the signing party followed by extraction of the hash digest for checking. For applications requiring heightened security, the RSA2048 may be used. Because digests produced though the various hashing functions, such as MD5, SHA-1, SHA256, SHA512, and others as noted previously, result in a much smaller size than the 2048 bit size yielded by the exemplary RSA2048 algorithm, the various RSA based PKCS standards conventionally available simply pad the provided digest with a fixed pattern, and insert a small field that specifies which algorithm in the list was used to sign the digest.

This padded hash signature whose size is 1024 bits or 2048 bits respectively, is then used as input to the RSA signing algorithm. The padding in such a digest is inefficient as it wastes the available space in the RSA operand space with padding, especially more so considering that the vast majority of files are signed without using SHA512, and as such, have digests sizes of less than 256 bytes (e.g., 2048 bits).

Thus, even if a small signature results, once hashed, there is typically large amounts of filler and padding is of no benefit. Accordingly, the depicted element 116 "m=" depicts a different structure in which padding is supplanted through the use of multiple defined hashing algorithms and multiple hashes corresponding to the respective hash functions A, B, and C at elements 106, 107, and 108, yielding an RSA modulus length of "n" at element 115, such as 1024 bits for RSA1024 or 2048 bits for RSA2048.

Another significant drawback of the conventional mechanism is that the signing party, the originating computing device, must make a decision on what digest/hashing algorithm to use, this typically results in the signing party selecting the strongest digest/hashing algorithm that any of its verifying parties may require, and thus imposing a performance penalty on some constrained devices that do not require such a heightened level of security. Thus, a sub-set of verifying devices requiring very strong security will get what they require, but then many other devices which do not require such security suffer what is essentially a lowest common denominator or one-size-fits all solution, which is far from ideal. Moreover, the devices requiring lesser security may simply blindly trust the original message without verification so as to negate the need to perform the more rigorous hashing algorithm, especially with regard to low powered and weaker performing devices, such as some smart phones, tablets, and other mobile computing devices which lack comprehensive hardware support for the more computationally intensive verification means. Conversely, the opposite may also be true in which the signer selects a weak hashing algorithm and the verifier requires a stronger offering, thus leaving the verifier with the problem of compromising its own security policy and accepting the weaker hashing algorithm or forgoing exchanges altogether with the signer.

Consider for example, that on a Westmere 32 nm (WSM) processor, a sign (RSA2048 decrypt) operation costs about 5 million computational cycles and verify operation (RSA2048 encrypt) costs just about 300,000 cycles. Application of a SHA256 hashing algorithm has performance of about 13 cycles/byte and MD5 which is less secure than SHA256 is about 5 cycles/byte. Therefore, given a 1 MB file, application of the SHA256 hashing algorithm translates to 13M cycles and application of the MD5 hashing algorithm translates to 5M cycles.

The total verification performance difference is therefore approximately 8M cycles for the verifier, every time verification must take place, which is significant, and which is attributable to the choice of hash digests to verify. The potential cost savings through practice of the described embodiments is therefore also significant where various levels of security are applicable for some devices such that certain devices may utilize a less computationally intensive hashing algorithm for the verification, in contrast to the conventional mechanism which forces this decision upon all verifying parties (e.g., too strong of security for some parities and thus needlessly poor performance) resulting in extremely rigid and wasteful operation.

Practice of the disclosed embodiments solve this problem by allowing the signing party to provide varying levels of security through the different digest/hashing algorithms pursuant to which the respective verifying parties can select which level of security is appropriate for them, despite only one signature 135 being distributed to the parties with varying security needs.

Within element 116 "m=" there is specifically shown an Identity (ID) at element 117 for the intermediate element 116 "m=" which is followed by some padding 118, but a lesser amount than would be present if only one hash was represented, and then the individual hash outputs, in which hash output A at element 119 corresponds to the X bytes 111 output from hash A at element 116, in which hash output B at element 120 corresponds to the Y bytes 112 output from hash B at element 107, and in which hash output C 121 corresponds to the Z bytes 113 output from hash C at element 108. These are followed by the hash IDs 122 identify which hashing algorithms are supported, specifically hash algorithms A, B, C at elements 106, 107, and 108, such that the resulting hash outputs A, B, and C 119, 120, 121 may be referenced by a verifier and compared to a reproduced hash of the original message with the corresponding hashing algorithm at the verifier, such as at recipient computing device 102 from FIGS. 1A and 1B. An "end" indication is provided at element 123.

In such a way, it is possible to publish several hash values and then when a recipient gets the signature, that recipient can select which hashing algorithm it wishes to utilized from among the multiple supported and identifiable from the inverted signature yielding the "m=" at element 116.

In a particular embodiment the hash IDs 122 is a mask of 8 bits that can be set or reset depending on which hash digests A, B, C (119, 120, and 121) are provided from an ordered set such as {MD5/SHA1/SHA256/SHA512}. There would be sufficient space to expand to four more hashing algorithms utilizing this particular example ordered set shown. Other combinations and variants of the exemplary ordered set are feasible as well.

The verifying entity, such as the receiving computing device, checks the hash IDs 122 for the supported hashing algorithms Hash A, B, C (e.g., 106, 107, and 108) provided by the signing entity and then the verifier selects of its own accord, which of the supported algorithms to use for verifying the signature 135, rather than having the decision forced upon it.

In such a way, recipient computing devices having differing levels of security, different levels of hardware acceleration dedicated to various hashing algorithms, different hash algorithm support, may nevertheless utilize the same distributed signature 135, even if they are performing the verification on that signature 135 using different hashing algorithms at the recipient's computing device, so long as it is one of the multiple hashing algorithms supported and identified within the "m=" at element 116 inverted from the signature 135.

On the side of the originating computing device which produces the signature 135 for distribution, hashing will need to be performed multiple times, specifically, once for each of the supported hashes or in this example, three times, once for hash A at 106, once for hash B at 107, and once for hash C at 108. Thus, a minor inefficiency is introduced to the processing of the originating computing device. However, the trade off is that creation of the signature happens just once, albeit using multiple hashing operations, whereas the verification process happens many times over, and each of the respective receiving computing devices need only perform one hashing function, but are now enabled to perform the one hashing algorithm at their selection, rather than having to perform a potentially less preferred hashing algorithm which is dictated by the originating device as is typical with the conventional methodologies.

FIGS. 2A and 2B set forth flow diagrams illustrating methods 200A and 200B for signing and verifying data using multiple hash algorithms and digests in PKCS in accordance with which embodiments may operate. Methods 200A and 200B may be performed by processing logic that may include hardware (e.g., circuitry, dedicated logic, programmable logic, microcode, etc.), including that of originating computing device 101 and receiving computing device 102 as set forth at FIGS. 1A and 1B. The numbering of the blocks presented is for the sake of clarity and is not intended to prescribe an order of operations in which the various blocks must occur.

At FIG. 2A, method 200A depicts operations at an originating computing device or a "sender" which is responsible for signing a message.

At block 205, processing logic for retrieving a message for signing at an originating computing device to yield a signature for the message.

At block 210, processing logic identifies, at the originating computing device, multiple hashing algorithms to be supported by the signature.

At block 215, for each of the multiple hashing algorithms identified to be supported, processing logic hashes the message to yield multiple hashes of the message corresponding to the multiple hashing algorithms identified.

At block 220, processing logic constructs a single digest having therein each of the multiple hashes of the messages corresponding to the multiple hashing algorithms identified and further specifying the multiple hashing algorithms to be supported by the signature.

At block 225, processing logic applies a signing algorithm to the single digest using a private key of the originating computing device to yield the signature for the message.

At block 230, processing logic distributes the message and the signature. For instance, the message and the signature may be distributed to one or more receiving computing devices via the public Internet or other such network.

At FIG. 2B, method 200B depicts operations at a receiving computing device or a "recipient" which is responsible for verifying a message.

At block 250, processing logic receives a message and a signature for the message at a receiving computing device from an originating computing device.

At block 255, processing logic retrieves a public key associated with the originating computing device for use in verifying the signature.

At block 260, processing logic inverts the signature via the public key to yield a plurality of hashes of the message by the originating computing device and a specification of supported hashing algorithms for the signature.

At block 265, processing logic selects one of the supported hashing algorithms for the signature and the corresponding one of the plurality of hashes of the message from the inverted signature. For instance, processing may further extract the necessary hash from the inverted result for later comparison with a locally generated hash using the same hashing algorithm as was used by the originating computing device.

At block 270, processing logic performs a hash on the message received from the originating computing device utilizing the selected one of the supported hashing algorithms to generate a local hash of the message.

At block 275, processing logic compares the local hash of the message to the corresponding one of the plurality of hashes of the message from the inverted signature.

At block 280, processing logic verifies or refutes the signature at the receiving computing device based on the comparison of the local hash to the hash of the message from the inverted signature.

Figure 3:
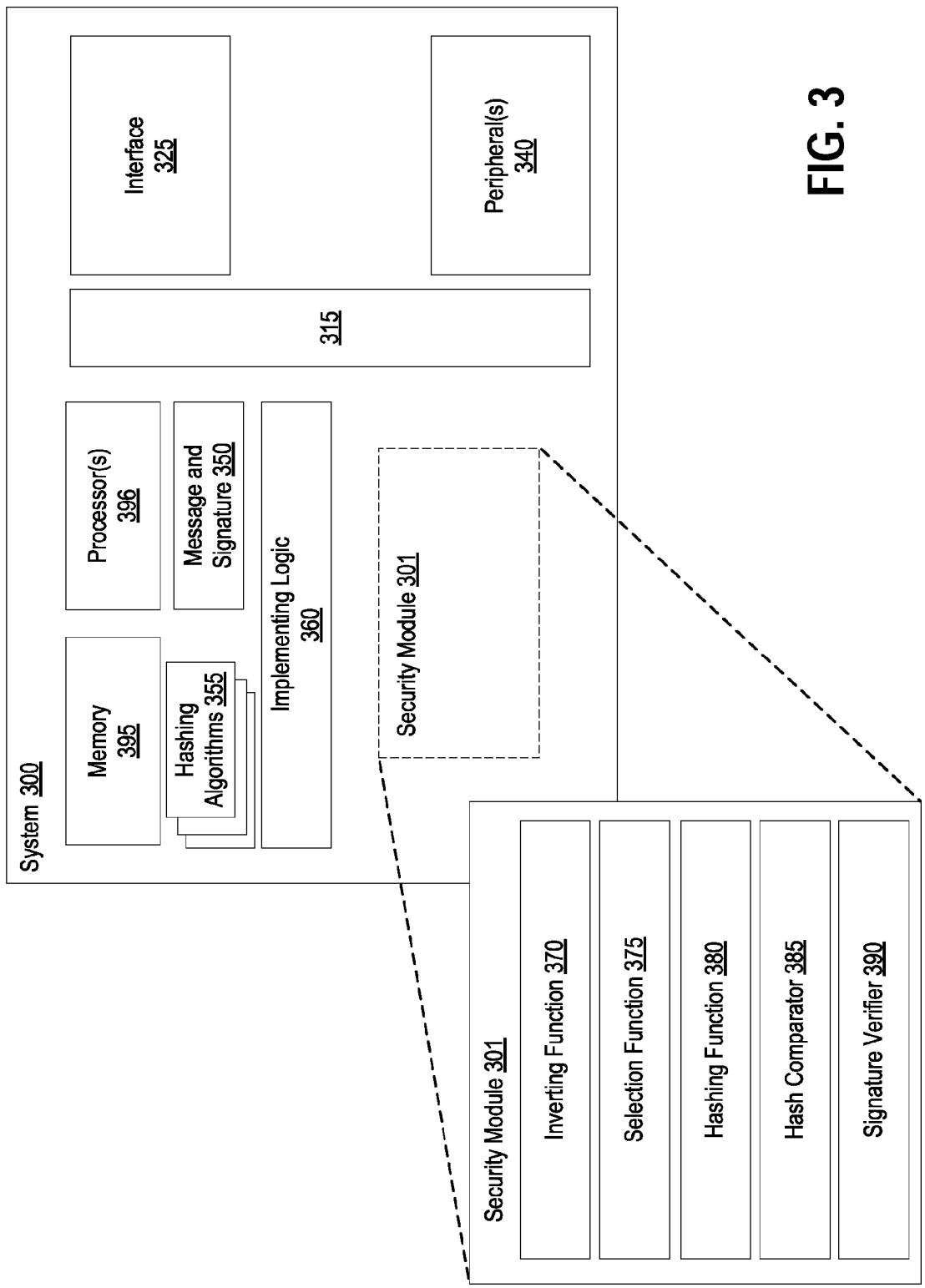
FIG. 3 shows a diagrammatic representation of a system having a security module optionally configured therein in accordance with which embodiments may operate.

FIG. 3 shows a diagrammatic representation of a system 300 having a security module 301 optionally configured therein in accordance with which embodiments may operate.

In one embodiment, system 300 includes a memory 395 and a processor or processors 396. For example, memory 395 may store instructions to be executed and processor(s) 396 may execute such instructions. Processor(s) 396 may also implement or execute implementing logic 360 having logic to implement the methodologies discussed herein. System 300 includes communication bus(es) 315 to transfer transactions, instructions, requests, and data within system 300 among a plurality of peripheral devices 340 communicably interfaced with one or more communication buses 315. In one embodiment, system 300 includes interface 325, for example, to retrieve information, receive messages and signatures, and otherwise interface with network elements located separately from system 300.

System 300 further includes a stored message and signature 350, for instance, having received them from an originating computing device, the message and signature 350 to be subjected to verification at the computing device as described herein. System 300 may further include one or more hashing algorithms 355, any of which may be initiated responsive to analysis of the message and signature 350 for verification purposes.

Distinct within system 300 is security module 301 which includes Inverting Function 370, Selection Function 375, Hashing Function 380, Hash Comparator 385, and Signature Verifier 390. The security module 301 may be installed and configured in a compatible system 300 as is depicted by FIG. 3, or provided separately so as to operate in conjunction with appropriate implementing logic 360 or other software. The security module 301 may be located in any of the previously described locations of the receiving computing device 102 of FIG. 1, including within a smart phone or tablet device operating as the receiving computing device 102.

Thus, it is in accordance with one embodiment that a system 300 having a processor 396 and memory 395 implements such a receiving computing device to operate in accordance with the previously described embodiments. According to one such embodiment, such a system or apparatus having the receiving computing device therein further includes: a security module to: (i) invert, via inverting function 370, the signature via the public key to yield a plurality of hashes of the message by the originating computing device and a specification of supported hashing algorithms for the signature, (ii) select, via selecting function 375, one of the supported hashing algorithms for the signature and the corresponding one of the plurality of hashes of the message from the inverted signature, (iii) perform, via the hashing function 380, a hash on the message received from the originating computing device utilizing the selected one of the supported hashing algorithms to generate a local hash of the message, (iv) compare, via the hash comparator 385, the local hash of the message to the corresponding one of the plurality of hashes of the message from the inverted signature, and (v) verify or refute, via the signature verifier 390, the signature at the receiving computing device based on the comparison of the local hash to the hash of the message extracted from the inverted signature.

Figure 4A:
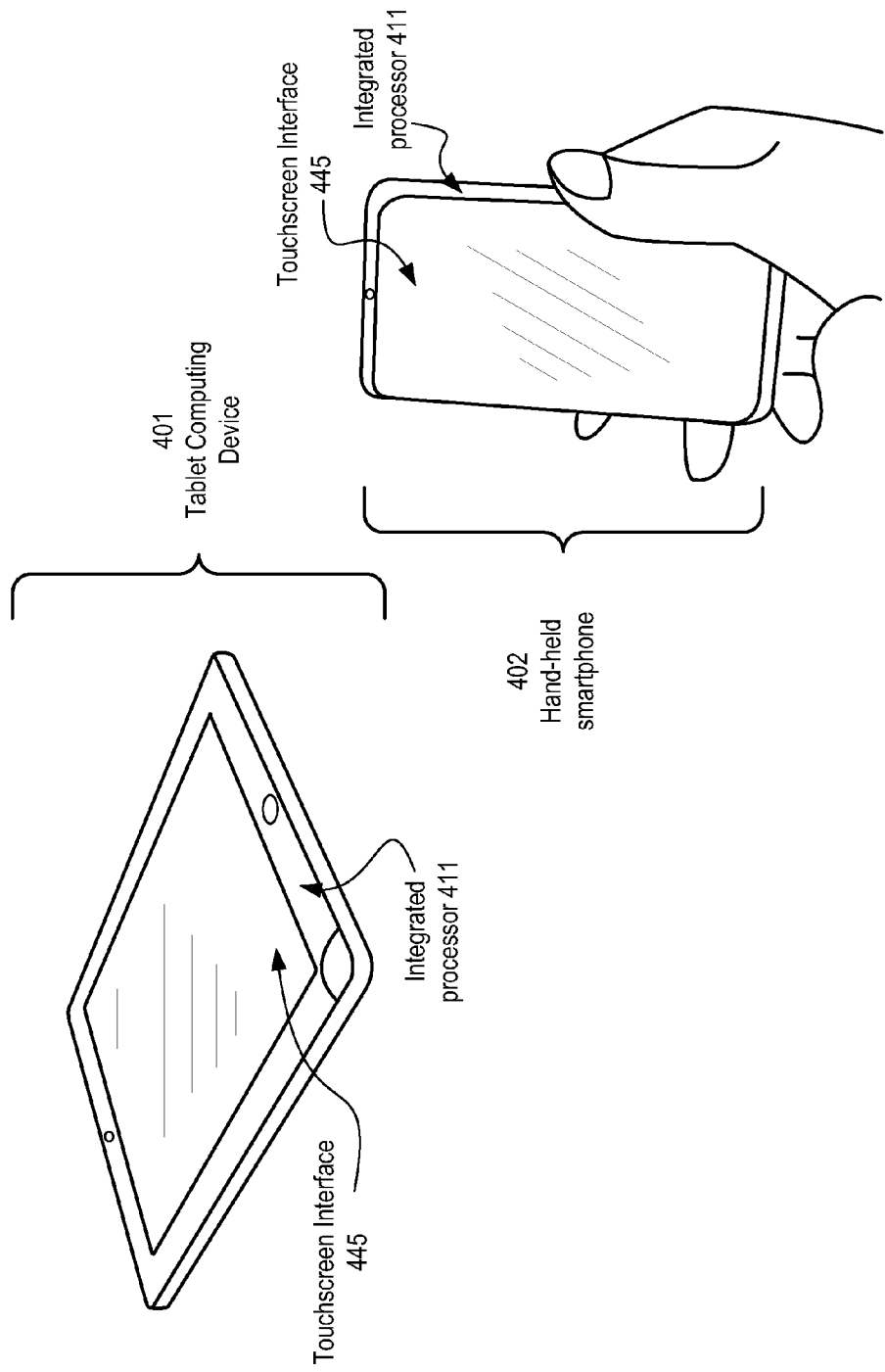
FIG. 4A depicts a tablet computing device and a hand-held smartphone each having a circuitry, components, and functionality integrated therein as described in accordance with the embodiments.

FIG. 4A depicts a tablet computing device 401 and a hand-held smartphone 402 each having a circuitry, components, and functionality integrated therein as described in accordance with the embodiments, such as a security module for a receiving computing device embodied within the tablet computing device 401 and a hand-held smartphone 402 for verifying data using multiple hash algorithms and digests in PKCS. As depicted, each of the tablet computing device 401 and the hand-held smartphone 402 include a touchscreen interface 445 and an integrated processor 411 in accordance with disclosed embodiments.

For example, in one embodiment, a client device, such as the exemplary computing platform depicted at element 101 of FIG. 1, may be embodied by a tablet computing device 401 or a hand-held smartphone 402, in which a display unit of the apparatus includes the touchscreen interface 445 for the tablet or smartphone and further in which memory and an integrated circuit operating as an integrated processor 411 are incorporated into the tablet or smartphone. In such an embodiment, the integrated processor 411 includes functionality to implement verifying data using multiple hash algorithms and digests in PKCS according to the techniques described above.

Figure 4B:
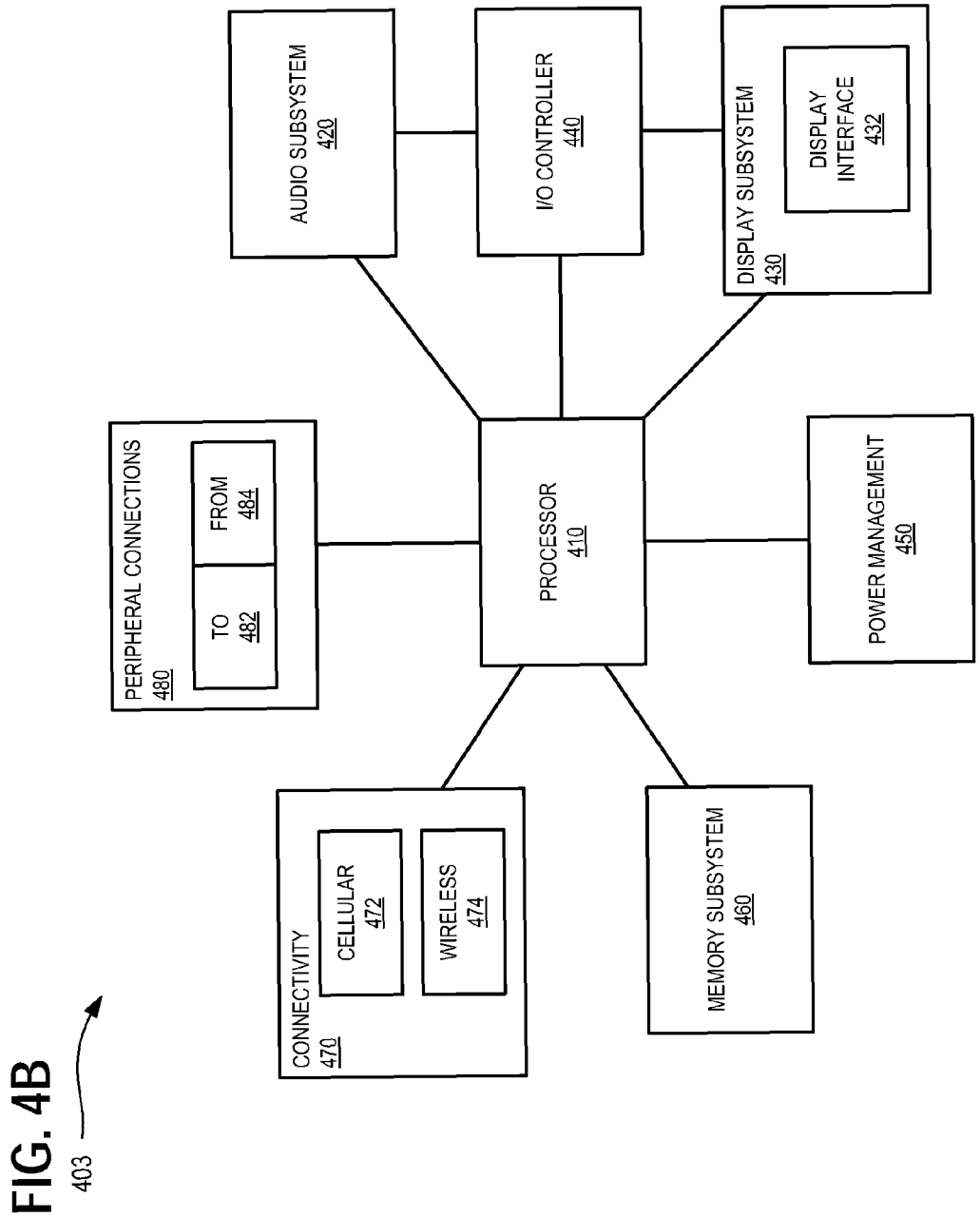
FIG. 4B is a block diagram of an embodiment of tablet computing device, a smart phone, or other mobile device in which touchscreen interface connectors are used.

FIG. 4B is a block diagram 403 of an embodiment of a tablet computing device, a smart phone, or other mobile device in which touchscreen interface connectors are used. Processor 410 performs the primary processing operations. Audio subsystem 420 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 410.

Display subsystem 430 represents hardware (e.g., display devices) and software (e.g., drivers) components that provide a visual and/or tactile display for a user to interact with the tablet computing device or smart phone. Display subsystem 430 includes display interface 432, which includes the particular screen or hardware device used to provide a display to a user. In one embodiment, display subsystem 430 includes a touchscreen device that provides both output and input to a user.

I/O controller 440 represents hardware devices and software components related to interaction with a user. I/O controller 440 can operate to manage hardware that is part of audio subsystem 420 and/or display subsystem 430. Additionally, I/O controller 440 illustrates a connection point for additional devices that connect to the tablet computing device or smart phone through which a user might interact. In one embodiment, I/O controller 440 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 450 that manages battery power usage, charging of the battery, and features related to power saving operation. Memory subsystem 460 includes memory devices for storing information in the tablet computing device or smart phone. Connectivity 470 includes hardware devices (e.g., wireless and/or wired connectors and communication hardware) and software components (e.g., drivers, protocol stacks) to the tablet computing device or smart phone to communicate with external devices. Cellular connectivity 472 may include, for example, wireless carriers such as GSM (global system for mobile communications), CDMA (code division multiple access), TDM (time division multiplexing), or other cellular service standards). Wireless connectivity 474 may include, for example, activity that is not cellular, such as personal area networks (e.g., Bluetooth), local area networks (e.g., WiFi), and/or wide area networks (e.g., WiMax), or other wireless communication.

Peripheral connections 480 include hardware interfaces and connectors, as well as software components (e.g., drivers, protocol stacks) to make peripheral connections as a peripheral device ("to" 482) to other computing devices, as well as have peripheral devices ("from" 484) connected to the tablet computing device or smart phone, including, for example, a "docking" connector to connect with other computing devices. Peripheral connections 480 include common or standards-based connectors, such as a Universal Serial Bus (USB) connector, DisplayPort including MiniDisplayPort (MDP), High Definition Multimedia Interface (HDMI), Firewire, etc.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent data base implementations), which communicate with each other via a bus 530. Main memory 504 includes information and instructions and software program components necessary for performing and executing the functions with respect to the various embodiments of the systems, methods, and entities as described herein including functionality to implement a secure platform based time server according to the techniques described above. The security module 524 may be stored within main memory 504 and operate in conjunction with the hashing algorithms depicted at element 534 for instance, to perform local hashes at the originating computing device or a receiving computing devices as necessary. Main memory 504 and its sub-elements (e.g. 522 and 524) are operable in conjunction with processing logic 526 and/or software 522, firmware, and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include one or more network interface cards 508 to communicatively interface the computer system 500 with one or more networks 520, such as the Internet or a publicly accessible network. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.). Hashing algorithms 534 may be integrated into the exemplary machine 500 consistent with the embodiments previously described, for example, as hardware acceleration for such hashing algorithms 534 or a hardware specific module to perform any one of the hashing algorithms, etc.

The secondary memory 518 may include a non-transitory machine-readable storage medium (or more specifically a non-transitory machine-accessible storage medium) 531 on which is stored one or more sets of instructions (e.g., software 522) embodying any one or more of the methodologies or functions described herein. Software 522 may also reside, or alternatively reside within main memory 504, and may further reside completely or at least partially within the processor 502 during execution thereof by the computer system 500, the main memory 504 and the processor 502 also constituting machine-readable storage media. The software 522 may further be transmitted or received over a network 520 via the network interface card 508.

In accordance with the preceding disclosure, the following exemplary embodiments are presented as follows:

According to a first embodiment there is method in an originating computing device, in which the method includes the operations for: retrieving, at the originating computing device, a message for signing at the originating computing device to yield a signature for the message; identifying multiple hashing algorithms to be supported by the signature; for each of the multiple hashing algorithms identified to be supported by the signature, hashing the message to yield multiple hashes of the message corresponding to the multiple hashing algorithms identified; constructing a single digest having therein each of the multiple hashes of the messages corresponding to the multiple hashing algorithms identified and further specifying the multiple hashing algorithms to be supported by the signature; applying a signing algorithm to the single digest using a private key of the originating computing device to yield the signature for the message; and distributing the message and the signature to receiving computing devices.

According to another embodiment of the method, distributing the message includes distributing the message to the receiving computing devices in an unencrypted state via a public Internet.

According to another embodiment of the method, the method further includes: maintaining the private key secret within the originating computing device; and publishing a public key without restriction, in which the public key is derived from the private key and further in which the public key is usable to invert the signature.

According to another embodiment of the method, the multiple hashing algorithms identified to be supported by the signature include at least two or more of the group of hashing algorithms including: a SHA-1 compliant hashing algorithm, a SHA-3 compliant hashing algorithm, a SHA256 compliant hashing algorithm, a MD5 compliant hashing algorithm, and a SHA512 compliant hashing algorithm.

According to another embodiment of the method, applying the signing algorithm includes applying an RSA-decrypt compliant algorithm using the private key of the originating computing device to yield an RSA compliant signature.

According to another embodiment of the method, the single digest having therein each of the multiple hashes of the messages corresponding to the multiple hashing algorithms identified and further specifying the multiple hashing algorithms to be supported by the signature includes: a padding portion of the single digest; multiple output fields corresponding to each of the respective multiple hashes of the messages; and hash identities (hash IDs) indicating the multiple hashing algorithms to be supported by the signature.

According to another embodiment of the method, the hash IDs is a mask of 8 bits for an ordered set corresponding to the multiple hashing algorithms to be supported by the signature.

According to another embodiment of the method, a first of the multiple hashing algorithms to be supported by the signature corresponds to a first security level, and where a second of the multiple hashing algorithms to be supported by the signature corresponds to a second security level which is different than the first security level which is less secure than the first security level.

According to another embodiment of the method, the signature is a Public-Key Cryptography Standards (PKCS) compliant signature and in which the message is one of plain text, an attachment having plain text, an unencrypted executable program, an encrypted plain text file, and encrypted binary file, or an unencrypted binary file.

According to another embodiment, there is a second method distinct from the first method, in which the second method includes operations for: receiving a message and a signature for the message at the receiving computing device from an originating computing device, the originating computing device having created the signature for the message; retrieving a public key associated with the originating computing device for use in verifying the signature; inverting the signature via the public key to yield a plurality of hashes of the message by the originating computing device and a specification of supported hashing algorithms for the signature; selecting one of the supported hashing algorithms for the signature and the corresponding one of the plurality of hashes of the message from the inverted signature; performing a hash on the message received from the originating computing device utilizing the selected one of the supported hashing algorithms to generate a local hash of the message; comparing the local hash of the message to the corresponding one of the plurality of hashes of the message from the inverted signature; and verifying or refuting the signature at the receiving computing device based on the comparison of the local hash to the hash of the message from the inverted signature.

According to another embodiment of the second method, retrieving the public key associated with the originating computing device includes retrieving the key from a trusted certificate authority distinct from the originating computing device, the trusted certificate authority responsible for maintaining and distributing public keys.

According to another embodiment of the second method, the originating computing device is a cloud computing services provider; and receiving the message and the signature for the message includes receiving each in an unencrypted state via a public Internet.

According to another embodiment of the second method, the receiving computing device is embodied within one of a tablet computing device or a smartphone.

According to another embodiment of the second method, specification of the supported hashing algorithms for the signature include at least two or more of the group of hashing algorithms including: a SHA-1 compliant hashing algorithm, a SHA-3 compliant hashing algorithm, a SHA256 compliant hashing algorithm, a MD5 compliant hashing algorithm, and a SHA512 compliant hashing algorithm.

According to another embodiment of the second method, a first of the supported hashing algorithms for the signature corresponds to a first security level, and where a second of the supported hashing algorithms for the signature corresponds to a second security level which is different than the first security level which is more secure than the first security level; and in which the receiving computing device selects the one of the supported hashing algorithms for the signature based on which of the supported hashing algorithms for the signature corresponds to a highest security level.

According to another embodiment of the second method, the receiving computing device selects the one of the supported hashing algorithms for the signature based on which of the supported hashing algorithms for the signature is supported by hardware acceleration for the one hashing algorithm within hardware of the receiving computing device.

According to another embodiment of the second method, the signature is a Public-Key Cryptography Standards (PKCS) compliant signature and in which the message is one of plain text, an attachment having plain text, an unencrypted executable program, or an unencrypted binary file.

According to another embodiment, there are one or more non-transitory computer readable storage media having instructions stored thereon that, when executed by a receiving computing device, the instructions cause the receiving computing device to perform operations including: receiving a message and a signature for the message at the receiving computing device from an originating computing device, the originating computing device having created the signature for the message; retrieving a public key associated with the originating computing device for use in verifying the signature; inverting the signature via the public key to yield a plurality of hashes of the message by the originating computing device and a specification of supported hashing algorithms for the signature; selecting one of the supported hashing algorithms for the signature and the corresponding one of the plurality of hashes of the message from the inverted signature; performing a hash on the message received from the originating computing device utilizing the selected one of the supported hashing algorithms to generate a local hash of the message; comparing the local hash of the message to the corresponding one of the plurality of hashes of the message from the inverted signature; and verifying or refuting the signature at the receiving computing device based on the comparison of the local hash to the hash of the message from the inverted signature.

According to another embodiment of the one or more non-transitory computer readable storage media, the originating computing device is a cloud computing services provider; and receiving the message and the signature for the message includes receiving each in an unencrypted state via a public Internet.

According to another embodiment of the one or more non-transitory computer readable storage media, the receiving computing device is embodied within one of a tablet computing device or a smartphone.

According to another embodiment, there is an apparatus or a system which implements a receiving computing device. According to such an embodiment, the system or apparatus includes: a processor and a memory; an interface to receive a message and a signature for the message at the receiving computing device from an originating computing device, the originating computing device having created the signature for the message; the interface to further retrieve a public key associated with the originating computing device for use in verifying the signature; and a security module to: (i) invert the signature via the public key to yield a plurality of hashes of the message by the originating computing device and a specification of supported hashing algorithms for the signature, (ii) select one of the supported hashing algorithms for the signature and the corresponding one of the plurality of hashes of the message from the inverted signature, (iii) perform a hash on the message received from the originating computing device utilizing the selected one of the supported hashing algorithms to generate a local hash of the message, (iv) compare the local hash of the message to the corresponding one of the plurality of hashes of the message from the inverted signature, and (v) verify or refute the signature at the receiving computing device based on the comparison of the local hash to the hash of the message from the inverted signature.

According to anther embodiment of the system or apparatus, the receiving computing device is embodied within one of a tablet computing device or a smartphone.

According to anther embodiment of the system or apparatus, the originating computing device is a cloud computing services provider; in which the receiving computing device is embodied within one of a tablet computing device or a smartphone; and in which receiving the message and the signature for the message includes receiving each in an unencrypted state via a public Internet at a wireless interface of the tablet computing device or smartphone.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in an originating computing device, the method comprising:
   retrieving, at the originating computing device, a message for signing at the originating computing device to yield a signature for the message;
   identifying multiple hashing algorithms to be supported by the signature, the signature comprising at least hash identities (hash IDs), the hash IDs being a mask of 8 bits for an ordered set corresponding to the multiple hashing algorithms to be supported by the signature;
   for each of the multiple hashing algorithms identified to be supported by the signature, hashing the message to yield multiple hashes of the message corresponding to the multiple hashing algorithms identified;
   constructing a single digest having therein each of the multiple hashes of the messages corresponding to the multiple hashing algorithms identified and further specifying the multiple hashing algorithms to be supported by the signature;
   applying a signing algorithm to the single digest using a private key of the originating computing device to yield the signature for the message; and
   distributing the message and the signature to receiving computing devices.

2. The method of claim 1, wherein distributing the message comprises distributing the message to the receiving computing devices in an unencrypted state via a public Internet.

3. The method of claim 1, wherein the method further comprises:
   maintaining the private key secret within the originating computing device; and
   publishing a public key without restriction, wherein the public key is derived from the private key and further wherein the public key is usable to invert the signature.

4. The method of claim 1, wherein the multiple hashing algorithms identified to be supported by the signature include at least two or more of the group of hashing algorithms comprising: a SHA-1 compliant hashing algorithm, a SHA-3 compliant hashing algorithm, a SHA256 compliant hashing algorithm, a MD5 compliant hashing algorithm, and a SHA512 compliant hashing algorithm.

5. The method of claim 1, wherein applying the signing algorithm comprises applying an RSA-decrypt compliant algorithm using the private key of the originating computing device to yield an RSA compliant signature.

6. The method of claim 1, wherein the single digest having therein each of the multiple hashes of the messages corresponding to the multiple hashing algorithms identified and further specifying the multiple hashing algorithms to be supported by the signature comprises:
   a padding portion of the single digest;
   multiple output fields corresponding to each of the respective multiple hashes of the messages; and
   the hash identities indicating the multiple hashing algorithms to be supported by the signature.

7. The method of claim 1, wherein a first of the multiple hashing algorithms to be supported by the signature corresponds to a first security level, and where a second of the multiple hashing algorithms to be supported by the signature corresponds to a second security level which is different than the first security level which is less secure than the first security level.

8. The method of claim 1, wherein the signature is a Public-Key Cryptography Standards (PKCS) compliant signature and wherein the message is one of plain text, an attachment having plain text, an unencrypted executable program, an encrypted plain text file, and encrypted binary file, or an unencrypted binary file.

9. One or more non-transitory computer readable storage media having instructions stored thereon that, when executed by a receiving computing device, the instructions cause the receiving computing device to perform operations including:
   receiving a message and a signature for the message at the receiving computing device from an originating computing device, the originating computing device having created the signature for the message, the signature comprising at least hash identities (hash IDs), the hash IDs being a mask of 8 bits for an ordered set corresponding to the multiple hashing algorithms supported by the signature;
   retrieving a public key associated with the originating computing device for use in verifying the signature;
   inverting the signature via the public key to yield a plurality of hashes of the message by the originating computing device and a specification of supported hashing algorithms for the signature;
   selecting one of the supported hashing algorithms for the signature and the corresponding one of the plurality of hashes of the message from the inverted signature;
   performing a hash on the message received from the originating computing device utilizing the selected one of the supported hashing algorithms to generate a local hash of the message;
   comparing the local hash of the message to the corresponding one of the plurality of hashes of the message from the inverted signature; and verifying or refuting the signature at the receiving computing device based on the comparison of the local hash to the hash of the message from the inverted signature.

10. The one or more non-transitory computer readable storage media of claim 9, wherein retrieving the public key associated with the originating computing device comprises retrieving the key from a trusted certificate authority distinct from the originating computing device, the trusted certificate authority responsible for maintaining and distributing public keys.

11. The one or more non-transitory computer readable storage media of claim 9:
wherein the originating computing device is a cloud computing services provider; and
receiving the message and the signature for the message comprises receiving each in an unencrypted state via a public Internet.

12. The one or more non-transitory computer readable storage media of claim 9, wherein the receiving computing device is embodied within one of a tablet computing device or a smartphone.

13. The one or more non-transitory computer readable storage media of claim 9, wherein specification of the supported hashing algorithms for the signature include at least two or more of the group of hashing algorithms comprising: a SHA-1 compliant hashing algorithm, a SHA-3 compliant hashing algorithm, a SHA256 compliant hashing algorithm, a MD5 compliant hashing algorithm, and a SHA512 compliant hashing algorithm.

14. The one or more non-transitory computer readable storage media of claim 9:
wherein a first of the supported hashing algorithms for the signature corresponds to a first security level, and where a second of the supported hashing algorithms for the signature corresponds to a second security level which is different than the first security level which is more secure than the first security level; and
wherein the receiving computing device selects the one of the supported hashing algorithms for the signature based on which of the supported hashing algorithms for the signature corresponds to a highest security level.

15. The one or more non-transitory computer readable storage media of claim 9, wherein the receiving computing device selects the one of the supported hashing algorithms for the signature based on which of the supported hashing algorithms for the signature is supported by hardware acceleration for the one hashing algorithm within hardware of the receiving computing device.

16. The one or more non-transitory computer readable storage media of claim 9, wherein the signature is a Public-Key Cryptography Standards (PKCS) compliant signature and wherein the message is one of plain text, an attachment having plain text, an unencrypted executable program, an encrypted plain text file, and encrypted binary file, or an unencrypted binary file.

17. One or more non-transitory computer readable storage media having instructions stored thereon that, when executed by an originating computing device, the instructions cause the originating computing device to perform operations including:
retrieving, at the originating computing device, a message for signing at the originating computing device to yield a signature for the message;
identifying multiple hashing algorithms to be supported by the signature, the signature comprising at least hash identities (hash IDs), the hash IDs being a mask of 8 bits for an ordered set corresponding to the multiple hashing algorithms to be supported by the signature;
for each of the multiple hashing algorithms identified to be supported by the signature, hashing the message to yield multiple hashes of the message corresponding to the multiple hashing algorithms identified;
constructing a single digest having therein each of the multiple hashes of the messages corresponding to the multiple hashing algorithms identified and further specifying the multiple hashing algorithms to be supported by the signature;
applying a signing algorithm to the single digest using a private key of the originating computing device to yield the signature for the message; and
distributing the message and the signature to receiving computing devices.

18. The one or more non-transitory computer readable storage media of claim 17, wherein the single digest having therein each of the multiple hashes of the messages corresponding to the multiple hashing algorithms identified and further specifying the multiple hashing algorithms to be supported by the signature comprises:
a padding portion of the single digest;
multiple output fields corresponding to each of the respective multiple hashes of the messages; and
the hash identities indicating the multiple hashing algorithms to be supported by the signature.

19. The one or more non-transitory computer readable storage media of claim 18, wherein a first of the multiple hashing algorithms to be supported by the signature corresponds to a first security level, and where a second of the multiple hashing algorithms to be supported by the signature corresponds to a second security level which is different than the first security level which is less secure than the first security level.

20. A receiving computing device, comprising:
a processor and a memory;
an interface to receive a message and a signature for the message at the receiving computing device from an originating computing device, the originating computing device having created the signature for the message, the signature having therein at least hash identities (hash IDs), the hash IDs being a mask of 8 bits for an ordered set corresponding to the multiple hashing algorithms supported by the signature;
the interface to further retrieve a public key associated with the originating computing device for use in verifying the signature; and
a security module to:
(i) invert the signature via the public key to yield a plurality of hashes of the message by the originating computing device and a specification of supported hashing algorithms for the signature,
(ii) select one of the supported hashing algorithms for the signature and the corresponding one of the plurality of hashes of the message from the inverted signature,
(iii) perform a hash on the message received from the originating computing device utilizing the selected one of the supported hashing algorithms to generate a local hash of the message,
(iv) compare the local hash of the message to the corresponding one of the plurality of hashes of the message from the inverted signature, and
(v) verify or refute the signature at the receiving computing device based on the comparison of the local hash to the hash of the message from the inverted signature.

21. The receiving computing device of claim 20, wherein the receiving computing device is embodied within one of a tablet computing device or a smartphone.

22. The receiving computing device of claim 20:
- wherein the originating computing device is a cloud computing services provider;
- wherein the receiving computing device is embodied within one of a tablet computing device or a smartphone; and
- wherein receiving the message and the signature for the message comprises receiving each in an unencrypted state via a public Internet at a wireless interface of the tablet computing device or smartphone.

* * * * *